United States Patent
Gliner et al.

(10) Patent No.: US 10,535,136 B2
(45) Date of Patent: Jan. 14, 2020

(54) REGISTRATION OF A MAGNETIC TRACKING SYSTEM WITH AN IMAGING DEVICE

(71) Applicant: Biosense Webster (Israel) Ltd., Yokneam (IL)

(72) Inventors: Vadim Gliner, Haifa (IL); Ram Bernard Mayer, Raanana (IL)

(73) Assignee: Biosense Webster (Israel) Ltd., Yokneam (IL)

(*) Notice: Subject to any disclaimer, the term of this patent is extended or adjusted under 35 U.S.C. 154(b) by 0 days.

(21) Appl. No.: 16/202,314

(22) Filed: Nov. 28, 2018

(65) Prior Publication Data
US 2019/0164282 A1 May 30, 2019

Related U.S. Application Data (63) Continuation of application No. 15/290,968, filed on Oct. 11, 2016, now Pat. No. 10,152,786.

(51) Int. Cl.
*G06K 9/00* (2006.01)
*G06T 7/00* (2017.01)
*G06T 7/30* (2017.01)

(52) U.S. Cl.
CPC .............. *G06T 7/0012* (2013.01); *G06T 7/30* (2017.01); *G06T 2207/10012* (2013.01); *G06T 2207/10081* (2013.01); *G06T 2207/30004* (2013.01)

(58) Field of Classification Search
None
See application file for complete search history.

(56) References Cited

U.S. PATENT DOCUMENTS

| | | | |
|---|---|---|---|
| 5,676,673 A | 10/1997 | Ferre et al. | |
| 5,999,840 A | 12/1999 | Grimson et al. | |
| 7,103,399 B2 | 9/2006 | Miga et al. | |
| 8,620,055 B2 | 12/2013 | Barratt et al. | |
| 10,152,786 B2 | 12/2018 | Gliner et al. | |
| 2004/0138548 A1 | 7/2004 | Strommer et al. | |
| 2008/0247622 A1* | 10/2008 | Aylward | A61B 90/36 382/131 |

(Continued)

OTHER PUBLICATIONS

European Search Report and Written Opinion dated Jan. 3, 2018 for EP Patent Application No. 17195644.4, 7 pages.

(Continued)

*Primary Examiner* — Wei Wen Yang
(74) *Attorney, Agent, or Firm* — Frost Brown Todd LLC (57) ABSTRACT

Described embodiments include a processor that receives signals from a probe, as the probe is placed at respective locations on a body of a subject, and derives, from the signals, a set of points that correspond to the respective locations. The processor then registers the set of points with a three-dimensional image of the body, by identifying, for each of the points, one or more voxels of the image whose respective surface normals are oriented within a given angle of an orientation at which the probe was held at the location to which the point corresponds, and computing a transformation that aligns each of the points with a selected one of the voxels that were identified for the point. The processor then tracks, based on the registering, a location of an intrabody tool, in a coordinate system of an imaging device that was used to acquire the image.

20 Claims, 3 Drawing Sheets

(56) References Cited

U.S. PATENT DOCUMENTS

| | | |
|---|---|---|
| 2008/0287787 A1 | 11/2008 | Sauer et al. |
| 2010/0111370 A1 | 5/2010 | Black et al. |
| 2010/0188504 A1 | 7/2010 | Dimsdale et al. |
| 2011/0107270 A1 | 5/2011 | Wang et al. |
| 2014/0105506 A1 | 4/2014 | Drost et al. |
| 2014/0193053 A1 | 7/2014 | Kadoury et al. |
| 2016/0133003 A1 | 5/2016 | Shin et al. |

OTHER PUBLICATIONS

Rusinkiewicz, S. et al., "Efficient Variants of the ICP Algorithm." 3-D Digital Imaging and Modeling, 2001. Proceedings. Third International Conference on. IEEE, 2001.

Rusu, Radu Bogdan, et al. "Aligning point cloud views using persistent feature histograms." 2008 IEEE/RSJ International Conference on Intelligent Robots and Systems. IEEE, 2008.

Ettinger, Gil J., et al. "Non-invasive functional brain mapping using registered transcranial magnetic stimulation." *Proceedings of the Workshop on Mathematical Methods in Biomedical Image Analysis.* IEEE, 1996.

European Communication dated Mar. 7, 2019 for Application No. 17195644.4, 7 pages.

European Communication dated Jul. 24, 2019 for Application No. 17195644.4, 6 pages.

\* cited by examiner

REGISTRATION OF A MAGNETIC TRACKING SYSTEM WITH AN IMAGING DEVICE

CROSS-REFERENCE TO RELATED APPLICATION

This applications is a continuation of U.S. Non-Provisional patent application Ser. No. 15/290,968, filed Oct. 11, 2016, issued Dec. 11, 2018 as U.S. Pat. No 10,152,786.

FIELD OF THE INVENTION

The present invention relates to the field of medical devices and associated software, and particularly, to the automatic registration of coordinate systems within the context of a medical procedure.

BACKGROUND

The Iterative Closest Point (ICP) algorithm is often used to register two sets, or "clouds," of points with one another. Using ICP, the "source cloud" is transformed to best match the "reference cloud," such that a measure of the distance between the two clouds is minimized. In its most basic implementation, the ICP algorithm iteratively performs the following sequence of steps, until some condition for convergence is satisfied:

1) For each point in the source cloud, a corresponding point (which may be referred to as the "nearest neighbor") in the reference cloud is found.

2) The transformation that minimizes the total distance between the two point clouds is computed, the total distance being the sum of the respective distances (computed, for example, as the squared Euclidean distances) between the source points and the corresponding reference points.

3) The source cloud is transformed using the computed transformation.

Rusu, Radu Bogdan, et al., "Aligning point cloud views using persistent feature histograms," 2008 IEEE/RSJ International Conference on Intelligent Robots and Systems, IEEE, 2008, which is incorporated herein by reference, investigates the usage of persistent point feature histograms for the problem of aligning point cloud data views into a consistent global model. Given a collection of noisy point clouds, the presented algorithm estimates a set of robust 16D features which describe the geometry of each point locally. By analyzing the persistence of the features at different scales, the algorithm extracts an optimal set which best characterizes a given point cloud. The resulted persistent features are used in an initial alignment algorithm to estimate a rigid transformation that approximately registers the input datasets. The algorithm provides good starting points for iterative registration algorithms such as ICP (Iterative Closest Point), by transforming the datasets to its convergence basin.

SUMMARY OF THE INVENTION

There is provided, in accordance with some embodiments of the present invention, a system that includes an electrical interface and a processor. The processor is configured to receive, via the electrical interface, a plurality of signals from a probe, as the probe is placed at respective locations on a body of a subject. The processor is further configured to derive, from the signals, a set of points that correspond to the respective locations. The processor is further configured to register the set of points with a three-dimensional image of the body of the subject, by identifying, for each point of the points, one or more voxels of the image whose respective surface normals are oriented within a given angle of an orientation at which the probe was held at the location to which the point corresponds, and computing a transformation that aligns each point of the points with a selected one of the voxels that were identified for the point. The processor is further configured to track, subsequently, based on the registering, a location of an intrabody tool in a coordinate system of an imaging device that was used to acquire the image.

In some embodiments, the processor is configured to align the set of points with the image, initially, with a first level of precision, and the computed transformation aligns the set of points with the image with a second level of precision that is greater than the first level of precision.

In some embodiments, the processor is configured to register the set of points with the image by iteratively performing the identifying and the computing.

In some embodiments, the processor is configured to iteratively perform the identifying and the computing by using an iterative closest point (ICP) algorithm.

In some embodiments, the given angle is less than 50 degrees.

In some embodiments, the transformation minimizes a distance metric between the set of points and the respective selected ones of the voxels.

In some embodiments, the distance metric is based on respective angles between (i) the respective surface normals of the selected ones of the voxels, and (ii) the respective orientations at which the probe was held.

In some embodiments, the processor is further configured to derive, from the signals, the orientation at which the probe was held at each of the locations.

In some embodiments, the processor is further configured to overlay, on the image, a visual representation of the intrabody tool, at a location in the image corresponding to the tracked location.

There is further provided, in accordance with some embodiments of the present invention, a method that includes registering, with a three-dimensional image of a body of a subject, a set of points that correspond to respective locations on the body at which a probe, which is tracked by a tracking system, was placed. The registering is performed by identifying, for each point of the points, one or more voxels of the image whose respective surface normals are oriented within a given angle of an orientation at which the probe was held at the location to which the point corresponds, and computing a transformation that aligns each point of the points with a selected one of the voxels that were identified for the point. The method further includes, subsequently, using the tracking system and based on the registering, tracking a location of an intrabody tool in a coordinate system of an imaging device that was used to acquire the image.

In some embodiments, the points correspond to respective locations on a face of the subject.

In some embodiments, the tracking system includes a magnetic tracking system.

The present invention will be more fully understood from the following detailed description of embodiments thereof, taken together with the drawings, in which:

DETAILED DESCRIPTION OF EMBODIMENTS

Overview

Embodiments of the present invention provide improved methods and systems for registering, prior to a medical procedure, a three dimensional image (or "volume") of a subject with a tracking system that is to be used for tracking an operating tool during the procedure. This allows the operating physician, during the procedure, to ascertain the position of the operating tool, relative to the anatomy of the subject. For example, based on the registration, a representation of the tool may be overlaid on an image acquired in real-time during the procedure, at the location in the image that corresponds to the current position of the tool.

In some embodiments, for example, prior to performing a sinus procedure on a subject, a volume of the subject's head is acquired, using computed tomography (CT). The acquired CT volume is then registered with a magnetic tracking system that is to be used to track the operating tool that is to be inserted into the subject's sinus. To perform the registration, a probe that is tracked by the magnetic tracking system is passed over the face of the subject, prior to or following the acquisition of the CT volume. At various locations on the face, the position of the probe, represented as a point in the coordinate system of the tracking system, is recorded. The magnetic tracking system is then registered with the CT volume, by registering the point set acquired from the probe with the CT volume.

To perform this registration, the ICP algorithm may be used. For example, the set of probe coordinates may be designated as the source cloud, such that the ICP algorithm iteratively (i) pairs each probe coordinate with a corresponding nearest-neighbor CT-volume voxel, and then (ii) applies, to the probe coordinates, the transformation that minimizes the total distance between the pairs of corresponding points. The composition of the transformations, computed over the multiple iterations, defines the registration between the two coordinate systems.

A challenge in using the ICP algorithm is that, sometimes, the algorithm converges slowly, due to poor nearest-neighbor selection at one or more iterations of the algorithm.

Embodiments of the present invention address this challenge, by using surface-geometrical information obtained from the probe to better perform the nearest-neighbor selection. In particular, as the probe coordinates are acquired, the probe is held such that the alignment of the probe is within a suitable angular threshold of the normal vector to the face. (In other words, the probe is held approximately perpendicular to the face.) Hence, by recording the orientation of the probe at each of the probe coordinates, the approximate respective orientations of the normal vectors at the probe coordinates may be obtained. Then, at each of the iterations, the candidate nearest neighbors for any one of the probe coordinates may be restricted to those voxels whose normal vectors are within a given angle of the probe orientation. Hence, inappropriate nearest-neighbor candidates may be filtered out, thus accelerating convergence of the algorithm.

For example, without using the techniques described herein, a probe coordinate immediately adjacent to the right side of the nose of the subject might be paired with a CT-volume voxel located at the bottom of the right side of the subject's nose, due to the proximity of this voxel. Using the techniques described herein, however, this CT-volume voxel would be removed from consideration as a candidate nearest-neighbor, due to the normal at this CT-volume voxel being approximately perpendicular to the normal at the probe coordinate.

Although the present disclosure mainly discusses the particular application described above—namely, a sinus procedure in which the magnetic tracking system is registered with a CT volume—it is noted that techniques described herein may be applied to accelerating a registration in the context of any kind of procedure, regardless of the particular imaging modalities or tracking systems that are used. In general, the points acquired from the probe may correspond to respective locations on a subject's face, and/or to respective locations on any other part of the subject's body. Moreover, techniques described herein may be applied to accelerating any sort of point-set registration algorithm in which the above-described point-correspondence challenge presents itself, including, for example, Robust Point Matching and Kernel Correlation.

System Description

Figure 1:
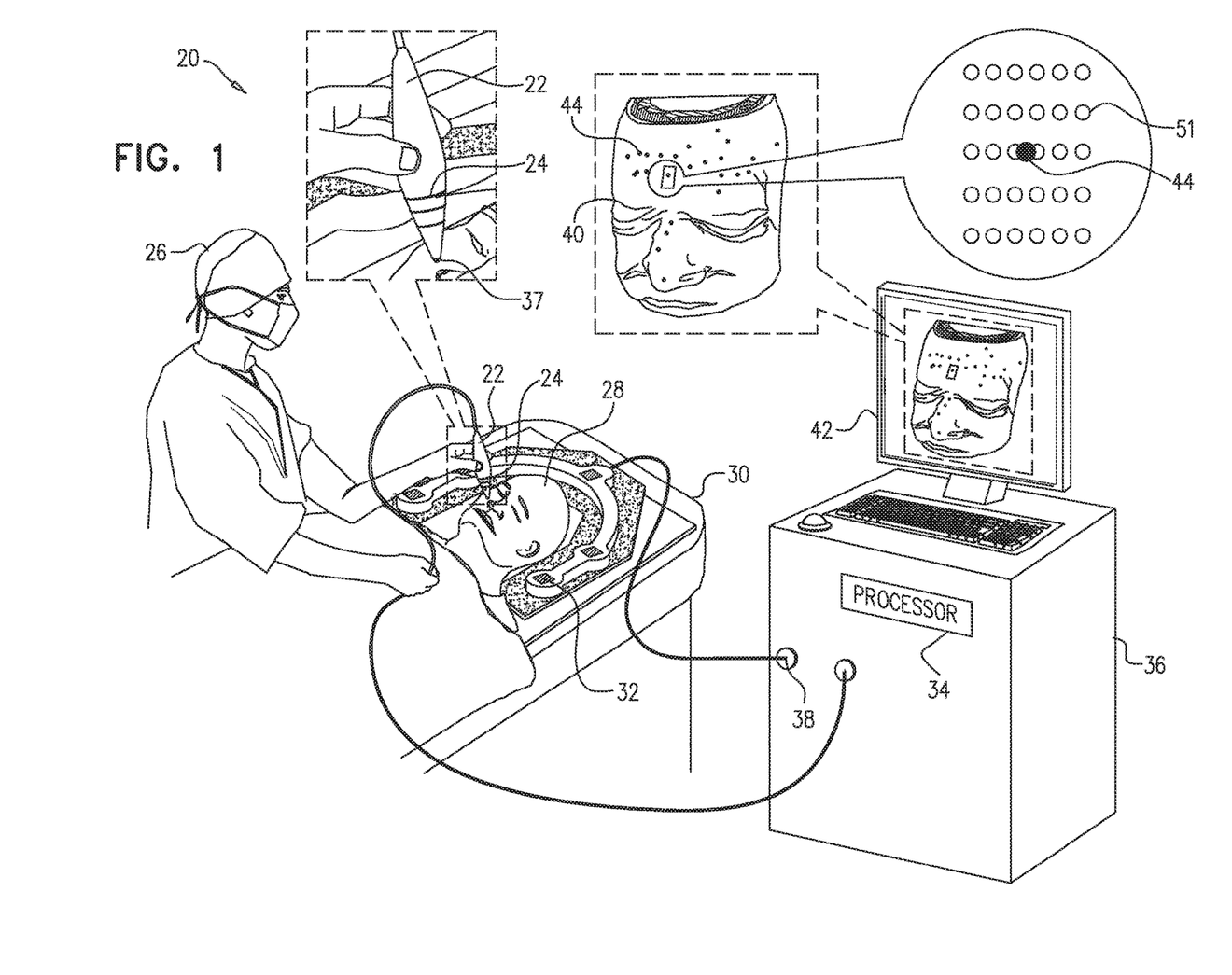
FIG. 1 is a schematic illustration of a magnetic tracking system, in accordance with some embodiments of the present invention.

Reference is initially made to FIG. 1, which is a schematic illustration of a magnetic tracking system 20, in accordance with some embodiments of the present invention. As further described below, system 20 may be used to facilitate the performance of a sinus procedure in which an intrabody operating tool is inserted into the sinus of a subject 28.

System 20 comprises one or more magnetic-field generators 32. During the procedure, generators 32 generate respective magnetic fields, which induce respective voltages in one or more magnetic sensors coupled to the operating tool. System 20 further comprises a processor 34, configured to control magnetic-field generators 32, ascertain the location and orientation of the tool based on the voltages induces in the magnetic sensors, as well as register the coordinate system of the tracking system with other coordinate systems, as described in detail below.

Prior to the sinus procedure, subject 28 typically lies, e.g., in a supine position, on an operating table 30, such that the head of the subject is near the magnetic-field generators. Subsequently, while the magnetic-field generators generate respective magnetic fields, a physician 26 touches the subject's face, at a plurality of locations, with the distal tip 37 of a probe 22, which comprises, at its distal end, one or more (e.g., three) magnetic sensors 24. At each point of contact between probe 22 and the subject's skin, the position of distal tip 37, and the orientation of the probe, are ascertained by processor 34, based on the voltages induced in sensors 24. (In other words, the magnetic tracking system is used to ascertain the location and orientation at which the probe is held.) The physician thus acquires a set of points 44, which correspond, in the three-dimensional coordinate system of the tracking system (which may also be referred to as the three-dimensional coordinate system of the probe), to the respective locations on the face of the subject at which the probe was placed. Typically, as explained above, the physician holds the probe approximately perpendicular to the subject's face, while acquiring the set of points 44.

As shown in FIG. 1, generators 32 may be arranged, on the surface of operating table 30, in a horseshoe configuration that surrounds the subject's head. Alternatively, the generators may located beside or underneath the operating table, and/or may be arranged in any other suitable configuration.

As shown in FIG. 1, system 20 typically comprises a console 36, comprising one or more electrical interfaces 38. Probe 22, and generators 32, are connected to processor 34 via electrical interfaces 38. Thus, via electrical interfaces 38, the processor may control the magnetic-field generators, and receive, from the probe, the signals (e.g., the induced voltages) that indicate the probe's position and orientation, as the probe is placed at the respective locations on the face of the subject. The processor may then derive, from the signals, the set of points 44, along with the associated probe orientations. (For simplicity, it may be stated that the processor receives the set of points 44, and associated probe orientations, from the probe.)

After the set of points has been acquired, processor 34 registers the set of points with a three-dimensional image 40 of the subject's head, which may be acquired, for example, by a CT imaging device. Typically, the processor first aligns the set of points with the image with a first, rough level of precision. This initial alignment may be performed, for example, by aligning several points corresponding to well-defined locations (e.g., the tip of the subject's nose) with corresponding voxels in the image. Typically, the physician manually identifies the points and the voxels, after which the processor computes the transformation that maps the identified points to the identified voxels, and applies this transformation to the point set.

Next, the processor refines the alignment, by computing a transformation that aligns the set of points with the volume with a second level of precision that is greater than the first level of precision. Typically, the processor performs an iterative refinement, whereby, during each iteration, the processor computes a successively more precise transformation. For example, the processor may use the ICP algorithm, which, as described above, performs an iterative registration. In some embodiments, processor 34 displays image 40 and points 44 on a display 42, during the registration procedure.

In general, processor 34 may be embodied as a single processor, or a cooperatively networked or clustered set of processors. Processor 34 is typically a programmed digital computing device comprising a central processing unit (CPU), random access memory (RAM), non-volatile secondary storage, such as a hard drive or CD ROM drive, network interfaces, and/or peripheral devices. Program code, including software programs, and/or data are loaded into the RAM for execution and processing by the CPU and results are generated for display, output, transmittal, or storage, as is known in the art. The program code and/or data may be downloaded to the computer in electronic form, over a network, for example, or it may, alternatively or additionally, be provided and/or stored on non-transitory tangible media, such as magnetic, optical, or electronic memory. Such program code and/or data, when provided to the processor, produce a machine or special-purpose computer, configured to perform the tasks described herein.

Figure 2:
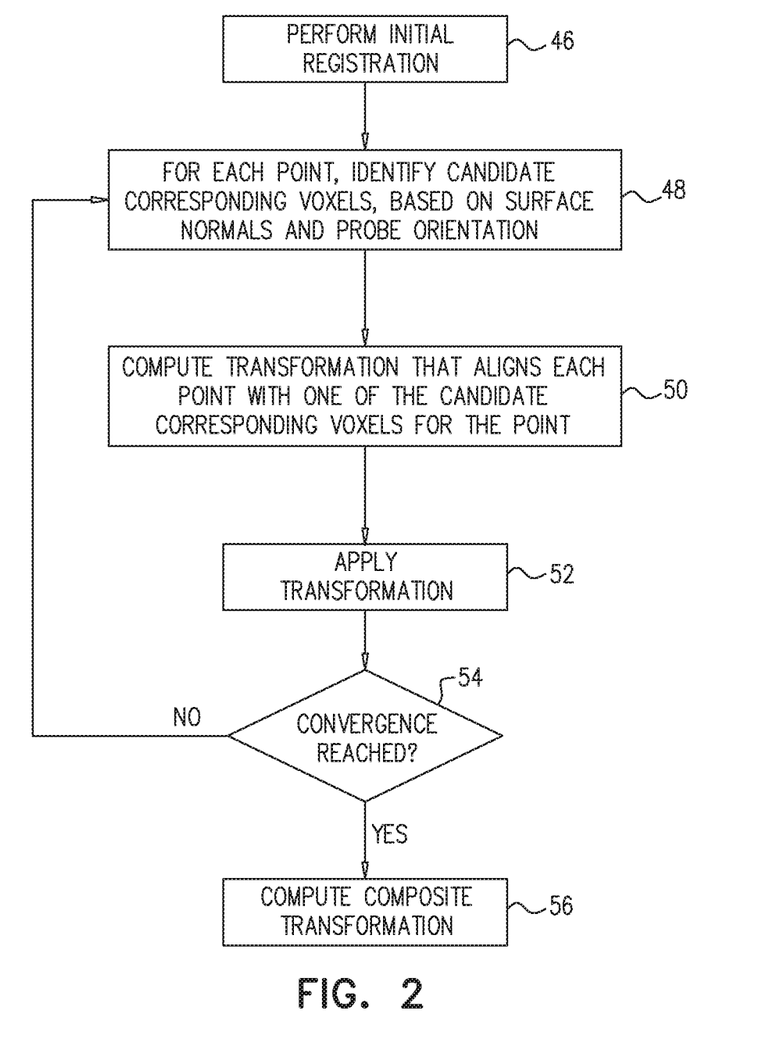
FIG. 2 is a flow diagram for a registration technique performed by a processor, in accordance with some embodiments of the present invention.

Reference is now additionally made to FIG. 2, which is a flow diagram for a registration technique performed by processor 34, in accordance with some embodiments of the present invention.

As described above, processor 34 first performs an initial registration of the point set with the image, at an initial-registration step 46. In other words, as described above, the processor computes a transformation that roughly aligns the points with the appropriate corresponding voxels in the image, and applies the computed transformation to the points.

Next, at an identifying step 48, the processor identifies, for each point in the point set, one or more candidate corresponding voxels 51, each of which will possibly be selected as the corresponding voxel, i.e., the nearest-neighbor voxel, of the point. Typically, the processor identifies, as the candidate voxels, only those voxels that are within a given distance of the point (at its current transformed location), and whose respective surface normals are oriented within a given angle of an orientation at which the probe was held at the location to which the point corresponds. (Any transformations applied to the point set are also applied to the orientation vectors of the probe, such that the angles between the orientation vectors and the surface normals may be properly calculated.) As further described below with respect to FIG. 3, by choosing the candidate voxels for a point based on the surface-normal orientations at these voxels, the processor may avoid the selection of an inappropriate corresponding voxel. (To ascertain the surface normals, the processor may use any suitable algorithm, such as the algorithm implemented in the Matlab® function "surfnorm.")

Subsequently, at a transformation-computing step 50, the processor computes a transformation that aligns each point with a selected one of the candidate corresponding voxels for the point. In computing this transformation, the processor typically minimizes a distance metric between the set of points and the selected corresponding voxels. For example, in one implementation of the ICP algorithm, assuming N points, the minimized distance D is $\|TP-Q\|^2$, where (i) P is a 4×N matrix containing, in each column, the homogenous coordinates of a respective one of the points, (ii) Q is a 3×N matrix containing, in each column, the coordinates of the corresponding voxels, and (iii) T is the 3×4 transformation matrix applied to P. In other words, the processor finds T and Q, where each voxel in Q is selected from the relevant set of candidates, that minimize the distance D. (It is noted that any other suitable distance metric, such as the "$L_1$" or "$L_\infty$" distance, may be minimized, alternatively to the "$L_2$" distance presented above.)

Subsequently, at a transforming step 52, the processor applies the computed transformation to the points. For example, during the $i^{th}$ iteration, assuming that the transformation matrix $T_i$ was found to minimize the distance between the point set and the corresponding voxels, the processor may compute $P_{i+1}=T_i P_i$. Then, at a checking step 54, the processor checks if convergence has been reached. For example, the processor may check if the distance D is below a threshold; alternatively, the processor may check if the computed transformation has moved the points by less than a threshold distance. If the algorithm has not yet converged, the processor performs another iteration of identifying step 48, computing step 50, and transforming step 52. Otherwise, the registration of the set of points with the image ends. Subsequently, if not yet performed during an earlier step, the processor computes the composite transformation that registers the coordinate system of the magnetic tracking system with that of the imaging device. For example, assuming an initial transformation $T_0$ used for the initial registration, and transformations $T_1 \ldots T_k$ computed during the k iterations of the registration algorithm, the composite transformation $T_c$ would be $T_0 \times T_1 \times \ldots T_k$.

Subsequently, during the procedure on the subject, the processor receives induced voltages from the magnetic sensors coupled to the intrabody tool. From these induced voltages, the processor derives the coordinates of the tool, in the coordinate system of the magnetic tracking system. The processor then applies the composite transformation to these coordinates, such as to map these coordinates to the coordinate system of the imaging device that was used to acquire the image. The processor thus tracks the location of the intrabody tool in the coordinate system of the imaging device. In other words, using the tracking system, and based on the registering, the location of the intrabody tool is tracked in the coordinate system of the imaging device; the tracking system tracks the location of the tool in the coordinate system of the tracking system, and the transformation computed during the registration then maps this location to the coordinate system of the imaging device.

Typically, during the procedure, the processor further overlays, on an image acquired by the imaging device, a visual representation of the intrabody tool, at a location in the image corresponding to the tracked location of the tool. The representation of the intrabody tool may be overlaid on image 40, or on another image acquired by the imaging device, such as an image acquired in real-time during the procedure.

Figure 3:
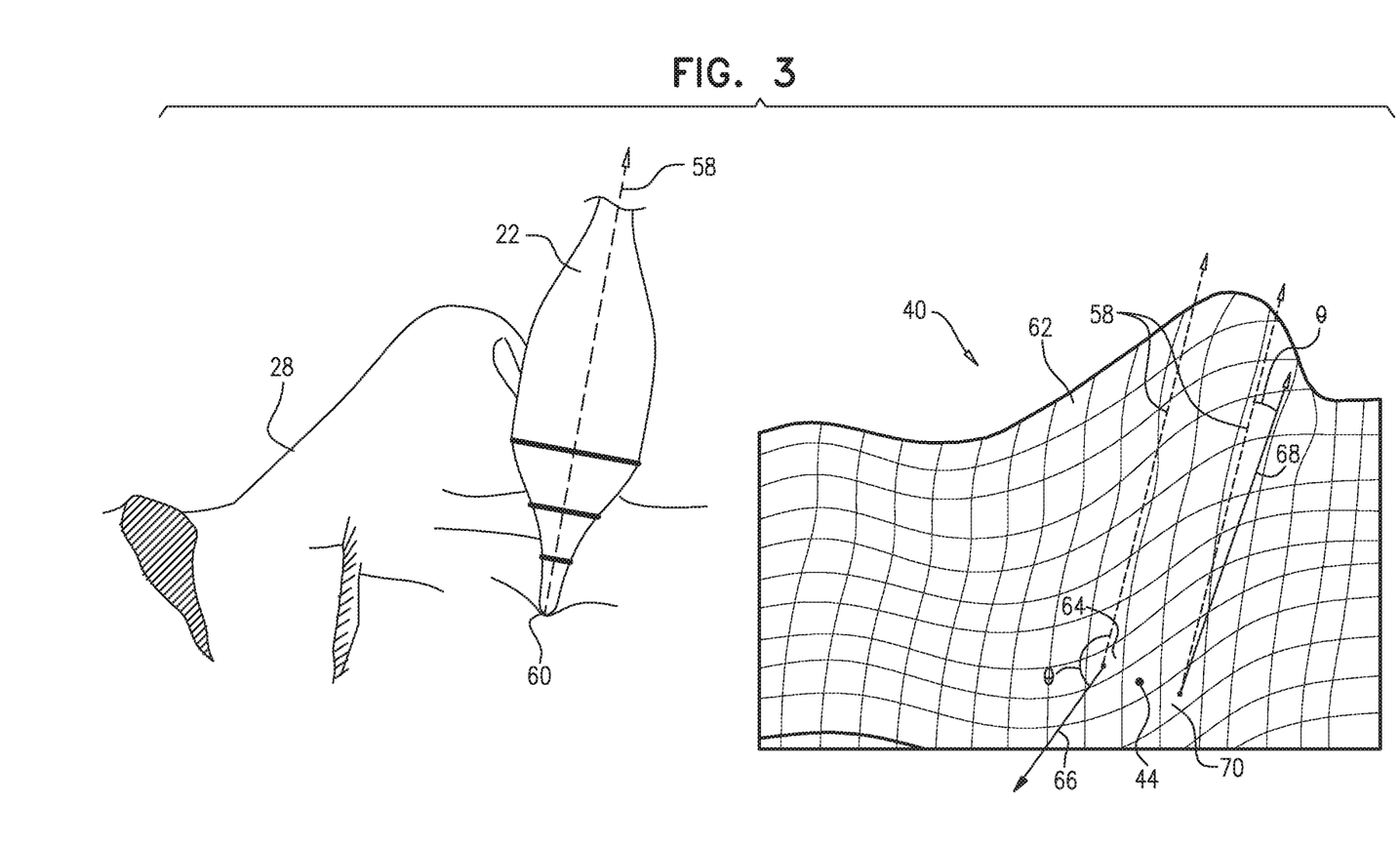
FIG. 3 is a schematic illustration of an identification of a candidate corresponding voxel, in accordance with some embodiments of the present invention.

Reference is now made to FIG. 3, which is a schematic illustration of an identification of a candidate corresponding voxel, in accordance with some embodiments of the present invention.

At the left, FIG. 3 shows a portion of the subject's face. Probe 22 touches the subject's face immediately adjacent to the subject's nose. The orientation of the probe is indicated by an orientation vector 58, which runs along the central longitudinal axis of the probe. Typically, as noted above, the physician holds the probe such that the probe is approximately perpendicular to the subject's face; hence, orientation vector 58 is approximately aligned with the normal vector to the subject's face at the location 60 at which the probe contacts the face.

At the right, FIG. 3 shows a three-dimensional image 40 of the same portion of the subject's face, image 40 including a plurality of voxels 62. As described above, during identifying step 48, the processor identifies candidate corresponding voxels for each of the points acquired from the probe. FIG. 3 illustrates this process for the particular point 44 that corresponds, in the coordinate system of the probe, to location 60. (It is assumed that one or more transformations have already been performed to point 44, such that the point is at roughly the correct location in the image.)

As described above, the challenge, during identifying step 48, is not to identify, as candidate corresponding voxels, those voxels that have little likelihood of corresponding to the point. For example, FIG. 3 specifies two particular voxels that are near point 44: a first voxel 64, and a second voxel 70. While second voxel 70 is, potentially, an appropriate match for point 44, first voxel 64, being located on the subject's nose, is clearly an inappropriate match; hence, a selection of first voxel 64 as the corresponding voxel for point 44 would likely cause the registration algorithm to converge more slowly, relative to if second voxel 70 were chosen.

As described above, the processor addresses this challenge, by performing a selective identification of candidate corresponding voxels, based on surface-normal information. For example, in identifying the candidate corresponding voxels for point 44, the processor may consider the normal vector 66 of first voxel 64, and the normal vector 68 of second voxel 70. In particular, the processor may calculate the respective angles theta (8) between these normal vectors and orientation vector 58. In the case of normal vector 68, this angle is relatively small; in the case of normal vector 66, on the other hand, this angle is relatively large. Hence, the processor may identify second voxel 70, but not first voxel 64, as a candidate corresponding voxel for point 44.

Assuming the physician holds the probe approximately perpendicular to the subject's face, theta is likely to be close to zero, for an appropriate candidate corresponding voxel. Nevertheless, the processor may set a threshold for theta that allows for some leeway in the orientation of the probe. For example, the threshold may have any suitable value that is less than 50 degrees, such as 45 degrees. Such a threshold allows for some leeway in the orientation of the probe, while still filtering out inappropriate candidate voxels.

The above-described embodiment uses the surface-normal information as a filter, to selectively identify candidate corresponding voxels. After the identification of the candidates, the selection of a respective corresponding voxel (i.e., nearest neighbor) for each point is performed, e.g., based on the usual distance-minimizing objective, without further consideration of the surface-normal information. In other words, the above-described embodiment uses the surface-normal information in identifying step 48, but not in computing step 50.

In other embodiments, the surface-normal information is alternatively or additionally used in computing step 50, for the selection of the corresponding voxels and computation of the transformation. For example, the distance that is minimized in computing step 50 may be based on the respective angles between the respective surface normals of the selected corresponding voxels, and the respective orientations at which the probe was held. For example, the distance metric may take the form $\|TP_i-Q\|^2+\alpha Q(\theta_1, \theta_2, \ldots \theta_N)$, where $\alpha$ is an appropriate weighting coefficient, and Q is a "penalty" function that maps the angles $\theta$ to a scalar value, whereby the scalar value increases for higher values of $\theta$. (Each angle $\theta_k$ is the angle between the orientation vector of the probe for the $k^{th}$ point, and the normal vector at the corresponding voxel for the $k^{th}$ point.)

EXAMPLE PSEUDOCODE

In an example embodiment, the following pseudocode, when implemented in any suitable programming language, may be used for identifying the candidate corresponding voxels, for each of the points in the point set, at identifying step 48. The example below includes several comments, each beginning with a double forward-slash ("//"), which explain the function of the pseudocode.

```
// Initialize the vector that will hold all of the candidates
vector< vec4 > skinSurfaceNeighbors;
// Define the cosine of 45 degrees (45 degrees being the angle
threshold)
const float COS45 = 0.707f;
// Loop over all cell-neighbors (neighboring voxels within a
particular distance)
for ( int i = 0; i < cellNeigbors.size ( ) ; i++ ) {
    // Get the voxel
    vec4 pos = m_dAsset->GetVolumeCoords( cellNeigbors[i] ) ;
    // Get the normal vector of the voxel
    vec4 n = m_dAsset->GetNormal(pos) ;
    n.Normalize ( ) ;
    // Get the orientation vector for the probe
    vec4 normPointDir = cathPointingDir.Normalize ( ) ;
    // Calculate the cosine of the angle between the normal
vector and the orientation vector
    float cosA = normPointDir.Dot (n) .GetElement<0> ( ) ;
    // Include this voxel as a candidate if it's on the skin
surface and the angle is less than 45 degrees
```

-continued

```
    if (isSkinSurfaceCell (cellNeigbors [i] ) && (cosA >= COS45) )
        skinSurfaceNeighbors.push_back ( pos ) ;
}
```

It will be appreciated by persons skilled in the art that the present invention is not limited to what has been particularly shown and described hereinabove. Rather, the scope of embodiments of the present invention includes both combinations and subcombinations of the various features described hereinabove, as well as variations and modifications thereof that are not in the prior art, which would occur to persons skilled in the art upon reading the foregoing description. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A system, comprising:
   (a) a probe interface; and
   (b) a processor, configured:
      to receive, via the probe interface, a plurality of signals from a probe, as the probe is placed at respective locations on a body of a subject, wherein the probe is positioned at respective orientation axes at each of the respective locations, such that each location has a corresponding probe orientation axis,
      (ii) to derive, from the plurality of signals:
         (A) a set of points that correspond to the respective locations, wherein the set of points comprises at least three points, and
         (B) the probe orientation axes associated with the respective locations,
      (iii) to store a three-dimensional image of at least a portion of the body of the subject, wherein the three-dimensional image comprises a set of voxels, each voxel of the set of voxels comprising an associated surface normal,
      (iv) to register the set of points with the three-dimensional image of at least a portion of the body of the subject by:
         (A) identifying, for each point of the set of points, a set of candidate voxels from the set of voxels based on the associated surface normals being within a given angle of the probe orientation axis for that point,
         (B) selecting, for each point of the set of points, a voxel from the set of candidate voxels for that point based on a distance metric between the set of points and the voxel of the set of candidate voxels for each point, and
         (C) computing a transformation that aligns each point of the set of points with the selected voxel for that point.

2. The system according to claim 1, wherein the processor is configured to align the set of points with the three-dimensional image, initially, with a first level of precision, and wherein the computed transformation aligns the set of points with the three-dimensional image with a second level of precision that is greater than the first level of precision.

3. The system according to claim 1, wherein the processor is configured to track, subsequently, based on the registering, a location of an intrabody tool, in a coordinate system of an imaging device that was used to acquire the three-dimensional image.

4. The system according to claim 3, wherein the processor is configured to iteratively perform the identifying and the computing by using an iterative closest point (ICP) algorithm until convergence of the set of points and the three-dimensional image is reached.

5. The system according to claim 1, wherein the given angle is less than 50 degrees.

6. The system according to claim 1, wherein the transformation minimizes the distance metric between each point of the set of points and the voxel of the set of candidate voxels for that point.

7. The system according to claim 6, wherein the distance metric is based on applying a penalty function that accounts for the size of respective angles between (i) the surface normal of the voxel, and (ii) the probe orientation axis.

8. A method, comprising:
   (a) storing a three-dimensional image of at least a portion of a body of a subject, wherein the three-dimensional image comprises a set of voxels, each voxel of the set of voxels comprising an associated surface normal;
   (b) receiving a set of points that correspond to respective locations on the body at which a probe, which is tracked by a tracking system, was placed, wherein the probe was placed at respective orientation axes at each of the respective locations, such that each location has a corresponding probe orientation axis, wherein the set of points comprises at least three points;
   (c) registering the set of points with the three-dimensional image by:
      (i) identifying for each point of the set of points, a set of candidate voxels from the set of voxels based on the associated surface normals being within a given angle of the probe orientation axis at that point, and,
      (ii) selecting, for each point of the set of points, a voxel from the set of candidate voxels for that point based on a distance metric between the set of points and the voxel of the set of candidate voxels for each point, and
      (iii) computing a transformation that aligns each point of the set of points with the selected voxel for that point.

9. The method according to claim 8, wherein registering the set of points with the three-dimensional image further comprises initially aligning the set of points with the three-dimensional image with a first level of precision, and wherein the computed transformation aligns the set of points with the three-dimensional image with a second level of precision that is greater than the first level of precision.

10. The method according to claim 8, further comprising using the tracking system and based on the registering, tracking a location of an intrabody tool in a coordinate system of an imaging device that was used to acquire the three-dimensional image.

11. The method according to claim 8, wherein the set of points correspond to respective locations on a face of the subject, wherein the respective locations include at least one location on a nose of the subject, and wherein the respective orientation axes at each of the respective locations are substantially perpendicular to the face at the respective locations.

12. The method according to claim 8, wherein the transformation minimizes the distance metric between each point of the set of points and the voxel of the set of candidate voxels for that point.

13. The method according to claim 12, wherein the distance metric is based on applying a penalty function that accounts for the size of respective angles between (i) the surface normal of the voxel, and (ii) the probe orientation axis.

14. The method according to claim 8, wherein the tracking system includes a magnetic tracking system.

15. The method according to claim 8, further comprising, using the tracking system, ascertaining the orientation at which the probe was held at each of the locations.

16. The method according to claim 8, further comprising overlaying, on the three-dimensional image, a visual representation of the intrabody tool, at a location in the three-dimensional image corresponding to the tracked location.

17. The system according to claim 1, wherein the probe orientation axes associated with the respective locations comprise a plurality of axes that are:
   (i) substantially perpendicular to the respective locations on the body,
   (ii) not parallel to the anterior-posterior axis, and
   (iii) not parallel to the caudal-cranial axis.

18. An apparatus comprising a processor, the processor configured to:
   (i) receive a plurality of signals from a probe, as the probe is placed at respective locations on a body of a subject,
   (ii) determine, based upon the plurality of signals, a set of points, each point of the set of points comprising a respective location and a corresponding probe orientation axis for the respective location,
   (iii) store a three-dimensional image of at least a portion of the body, wherein the three-dimensional image comprises a set of voxels, each voxel of the set of voxels comprising an associated surface normal,
   (iv) register the set of points with the three-dimensional image by:
      (A) identifying, for each point of the set of points, a set of candidate voxels from the set of voxels based on the associated surface normals being within a given angle of the probe orientation axis at that point, and
      (B) computing a transformation that aligns each point of the set of points with a voxel of the set of candidate voxels for that point based on a distance metric between the set of points and the voxel of the set of candidate voxels for each point.

19. The apparatus according to claim 18, wherein the transformation minimizes the distance metric between each point of the set of points and the voxel of the set of candidate voxels for that point.

20. The apparatus according to claim 18, wherein the distance metric is based on applying a penalty function that accounts for the size of respective angles between (i) the surface normal of the voxel, and (ii) the probe orientation axis.

* * * * *